(12) United States Patent
Ryu et al.

(10) Patent No.: US 7,816,033 B2
(45) Date of Patent: Oct. 19, 2010

(54) CATHODE ACTIVE MATERIAL COMPRISING MIXTURE OF LITHIUM/MANGANESE SPINEL OXIDE AND LITHIUM/NICKEL/COBALT/MANGANESE OXIDE AND LITHIUM SECONDARY BATTERY CONTAINING SAME

(75) Inventors: Ji Heon Ryu, Seoul (KR); Jung Eun Hyun, Seoul (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/227,837

(22) PCT Filed: May 29, 2007

(86) PCT No.: PCT/KR2007/002589

§ 371 (c)(1),
(2), (4) Date: Sep. 15, 2009

(87) PCT Pub. No.: WO2007/139333

PCT Pub. Date: Dec. 6, 2007

(65) Prior Publication Data

US 2010/0012886 A1    Jan. 21, 2010

(30) Foreign Application Priority Data

May 29, 2006   (KR) ...................... 10-2006-0047893

(51) Int. Cl.
  H01M 4/58   (2010.01)
  H01M 4/00   (2010.01)
  H01M 4/50   (2010.01)
(52) U.S. Cl. .................... 429/218.1; 429/223; 429/224; 429/231.1
(58) Field of Classification Search ........................ None
See application file for complete search history.

(56) References Cited

U.S. PATENT DOCUMENTS

| | | | |
|---|---|---|---|
| 6,746,800 B1 | 6/2004 | Sunagawa et al. | |
| 6,808,848 B2 | 10/2004 | Nakanishi et al. | |
| 7,198,871 B2 | 4/2007 | Kitao et al. | |
| 7,217,475 B2 | 5/2007 | Nakanishi et al. | |
| 2001/0031399 A1 | 10/2001 | Jung et al. | |
| 2002/0061443 A1 | 5/2002 | Nakanishi et al. | |
| 2004/0142234 A1 | 7/2004 | Nakanishi et al. | |
| 2005/0271943 A1* | 12/2005 | Park et al. ................ | 429/231.1 |
| 2006/0035151 A1 | 2/2006 | Kumeuchi et al. | |
| 2006/0046155 A1 | 3/2006 | Inagaki et al. | |
| 2006/0134515 A1 | 6/2006 | Kumashiro et al. | |
| 2006/0216601 A1 | 9/2006 | Komiyama et al. | |
| 2006/0257737 A1 | 11/2006 | Goh et al. | |
| 2006/0286459 A1 | 12/2006 | Zhao et al. | |
| 2007/0026315 A1 | 2/2007 | Lampe-Onnerud et al. | |
| 2007/0048597 A1 | 3/2007 | Ryu et al. | |
| 2007/0154815 A1 | 7/2007 | Kawasaki et al. | |
| 2007/0190420 A1 | 8/2007 | Ryu et al. | |
| 2007/0212609 A1 | 9/2007 | Iwami | |
| 2008/0083901 A1 | 4/2008 | Park | |
| 2008/0085452 A1 | 4/2008 | Park | |

FOREIGN PATENT DOCUMENTS

| | | |
|---|---|---|
| EP | 1174937 | 1/2002 |
| EP | 1193782 | 4/2002 |
| EP | 1730802 | 12/2006 |
| EP | 1831952 | 9/2007 |
| EP | 1885011 | 2/2008 |
| EP | 1909345 | 4/2008 |
| EP | 1917692 | 5/2008 |
| JP | 11-10159 A | 2/1999 |
| JP | 11040159 | 2/1999 |
| JP | 11-213999 A | 8/1999 |
| JP | 2000315503 | 11/2000 |
| JP | 2002-110253 A | 4/2002 |
| JP | 2002100358 | 4/2002 |
| JP | 2003092108 | 3/2003 |
| JP | 2003157844 | 5/2003 |
| JP | 2004-134245 A | 4/2004 |
| JP | 2004-220801 A | 8/2004 |
| JP | 2005135864 | 5/2005 |
| JP | 2005251713 | 9/2005 |
| JP | 2005267956 | 9/2005 |
| JP | 2005-339970 A | 12/2005 |
| JP | 2006252895 | 9/2006 |
| JP | 2006278322 | 10/2006 |
| JP | 2006332020 | 12/2006 |
| JP | 2006344390 | 12/2006 |
| JP | 2006344391 | 12/2006 |
| JP | 2007080583 | 3/2007 |
| JP | 2007188699 | 7/2007 |
| JP | 2007250198 | 9/2007 |
| JP | 2007287569 | 11/2007 |
| JP | 2007317639 | 12/2007 |
| JP | 2008053054 | 3/2008 |
| JP | 2008091341 | 4/2008 |
| KR | 20010081435 | 8/2001 |
| KR | 20020025815 | 4/2002 |
| KR | 20020026655 | 4/2002 |

(Continued)

*Primary Examiner*—Dah-Wei D Yuan
*Assistant Examiner*—Kwang Han
(74) *Attorney, Agent, or Firm*—Lerner, David, Littenberg, Krumholz & Mentlik, LLP

(57) ABSTRACT

Provided is a high-power, non-aqueous electrolyte lithium secondary battery having a long lifespan and superior safety at both room temperature and high temperatures, even after repeated high-current charging and discharging. The battery comprises a mixture of a manganese spinel oxide and a lithium/nickel/cobalt/manganese composite oxide, as a cathode active material.

12 Claims, No Drawings

FOREIGN PATENT DOCUMENTS

| | | |
|---|---|---|
| KR | 2002-00800448 A | 10/2002 |
| KR | 20020087627 A | 11/2002 |
| KR | 20040026378 | 3/2004 |
| KR | 20040032780 | 4/2004 |
| KR | 20050049746 | 5/2005 |
| KR | 10-0570417 A | 4/2006 |
| KR | 20060044953 | 5/2006 |
| KR | 20060097630 | 9/2006 |
| KR | 20060127756 | 12/2006 |
| KR | 20070114411 | 12/2007 |
| KR | 20080066875 | 7/2008 |
| WO | 02086993 | 10/2002 |
| WO | 03081698 | 10/2003 |
| WO | 2004105162 | 12/2004 |
| WO | 2005057713 | 6/2005 |
| WO | WO 2005/124898 | * 12/2005 |
| WO | 2006004279 | 1/2006 |
| WO | 2006071972 | 7/2006 |
| WO | 2007021086 | 2/2007 |
| WO | 2007021087 | 2/2007 |

\* cited by examiner

CATHODE ACTIVE MATERIAL COMPRISING MIXTURE OF LITHIUM/MANGANESE SPINEL OXIDE AND LITHIUM/NICKEL/COBALT/MANGANESE OXIDE AND LITHIUM SECONDARY BATTERY CONTAINING SAME

CROSS REFERENCE TO RELATED APPLICATIONS

The present application is a national phase entry under 35 U.S.C. §371 of International Application No. PCT/KR2007/002589, filed May 29, 2007, published in English, which claims the benefit of Korean Patent Application No. 10-2006-0047893, filed May 29, 2006. The disclosures of all of said applications are incorporated by reference herein.

FIELD OF THE INVENTION

The present invention relates to a high-power, non-aqueous electrolyte lithium secondary battery having a long-term lifespan and superior safety at both room temperature and high temperatures, even after repeated high-current charge and discharge.

BACKGROUND OF THE INVENTION

Technological development and increased demand for mobile equipment have led to a rapid increase in the demand for secondary batteries as an energy source. In recent years, applicability of secondary batteries has been realized as power sources for electric vehicles (EVs) and hybrid electric vehicles (HEVs). In the light of such trends, a great deal of research and study has been focused on secondary batteries which are capable of meeting various demands. Among other things, there has been an increased demand for lithium secondary batteries having high-energy density, high-discharge voltage and high-power output stability.

Particularly, lithium secondary batteries for use in EVs require not only a high-energy density and a capability to exert a large power output within a short period of time, but also a long-term lifespan of more than 10 years even under severe conditions in which high-current charge/discharge cycles are repeated within a short time, thus necessitating remarkably superior safety and long-term lifespan as compared to conventional small-size lithium secondary batteries.

Lithium ion secondary batteries that have been used in conventional small-size batteries generally employ a layered structure of lithium cobalt composite oxide as a cathode material and a graphite-based material as an anode material. However, the main constitutional element of the lithium cobalt composite oxide, cobalt, is very expensive and is not suitable for use in electric vehicles due to safety concerns. Therefore, as the cathode material of lithium ion batteries for EVs, a lithium manganese composite oxide having a spinel structure may be suitable which is made up of cheap and highly safe manganese.

However, the lithium manganese composite oxide, upon high-temperature and large-current charge/discharge, undergoes dissolution of manganese ions into an electrolyte due to the influence of the electrolyte, thus resulting in degradation of battery properties and performance. Thus, there is a need for measures to prevent such problems. In addition, the lithium manganese composite oxide has drawbacks such as a low capacity per unit weight, i.e., a low charge density, as compared to conventional lithium cobalt composite oxides or lithium nickel composite oxides. Thus, there is a limit to the charge density of the battery. Also, in order to enter practical use as the power source of EVs, designs of the battery to solve such disadvantages should be created together.

In order to alleviate the above-mentioned respective disadvantages, various studies and attempts have been made to fabricate electrodes using a mixed cathode active material. For example, Japanese Unexamined Patent Publication Nos. 2002-110253 and 2004-134245 disclose techniques utilizing a mixture of a lithium/manganese composite oxide, and a lithium/nickel/cobalt/manganese composite oxide and/or a lithium/nickel/cobalt/manganese composite oxide to enhance a recovery output. These conventional prior arts, however, still suffer from problems associated with a poor cycle life of the lithium manganese oxide and limited improvement of safety.

Meanwhile, Korean Patent No. 0458584 discloses a cathode active material composed of a nickel-based, large-diameter active material compound having an average particle diameter of 7 to 25 μm and a small-diameter active material compound having an average particle diameter of 2 to 6 μm (for example, $Li_xMn_{2-z}X_z$, wherein X is F, S or P, $0.90 \leq x \leq 1.1$, and $0 \leq z \leq 0.5$), in order to increase a battery capacity by improving a volumetric density of an electrode plate.

Further, in order to improve capacity characteristics, lifespan characteristics and high-rate discharge characteristics of batteries, Korean Patent No. 0570417 discloses a secondary battery using a spinel $LiMn_2O_4$ cathode as a cathode active material, Korean Unexamined Patent Publication No. 2002-0080448 discloses a secondary battery using a cathode active material containing a lithium manganese composite oxide, and Japanese Unexamined Patent Publication No. 2004-134245 discloses a secondary battery using a cathode active material containing a spinel lithium manganese composite oxide and a lithium transition metal composite oxide.

However, the construction of the secondary battery having a combination of desired levels of the lifespan and safety has not yet been proposed, despite the aforementioned conventional prior arts.

SUMMARY OF THE INVENTION

Therefore, it is an object of the present invention to solve the above problems, and other technical problems that have yet to be resolved.

As a result of a variety of extensive and intensive studies and experiments to solve the problems as described above, the inventors of the present invention have surprisingly discovered that upon fabrication of a secondary battery using a cathode active material composed of a mixture of a manganese spinel oxide having a substitution of an oxygen site with a certain anion which exhibits a strong binding ability with a transition metal, in conjunction with a lithium/nickel/cobalt/manganese composite oxide, the thus-fabricated battery can secure excellent safety, simultaneously with a long-term lifespan at both room temperature and high temperatures, even after repeated high-current charge and discharge, as compared to separate use of the aforementioned oxides. The present invention has been completed based on these findings.

Specifically, an object of the present invention is to provide a cathode active material comprising a mixture of a lithium/nickel/cobalt/manganese composite oxide and a manganese spinel oxide having a substitution of an oxygen site with a certain anion which exhibits a strong binding ability with a transition metal, and a secondary battery comprising the above-mentioned cathode active material.

DETAILED DESCRIPTION OF PREFERRED EMBODIMENTS

In accordance with an aspect of the present invention, the above and other objects can be accomplished by the provision of a cathode active material for a lithium secondary battery, comprising a mixture of a lithium/manganese spinel oxide represented by Formula I below and a lithium/nickel/cobalt/manganese oxide represented by Formula II below:

$$Li_{1+x}Mn_{2-y}M_yO_{4-z}A_z \quad (I)$$

wherein,

M is a metal having an oxidation number of 2 to 3, and is at least one selected from the group consisting of B, Mg, Al, Ca, Sr, Co, Ni, Cr, Cu, Fe, Ti, Y, Zn and any combination thereof;

A is an anion having an oxidation number of −1 or −2;

$0 \leq x \leq 0.2$;

$0 \leq y \leq 0.2$; and $0 < z \leq 0.5$.

$$Li_{1+a}Ni_bMn_cCo_{1-(b+1)}O_2 \quad (II)$$

wherein, $0 \leq a \leq 0.1$;

$0.2 \leq b \leq 0.7$;

$0.2 \leq c \leq 0.7$; and $b+c<1$.

In accordance with another aspect of the present invention, there is provided a lithium secondary battery comprising the aforesaid cathode active material-containing cathode, an anode, a separator and a non-aqueous electrolyte.

Hereinafter, the present invention will be described in more detail.

As discussed hereinbefore, the present invention is characterized by using a mixture of the lithium/nickel/cobalt/manganese oxide with the lithium/manganese spinel oxide wherein a portion of manganese (Mn) is substituted with other elements, as a cathode active material.

In the lithium/manganese spinel oxide of Formula I, the oxygen ion is substituted with an anion (A) having an oxidation number of −1 or −2 within the given range. Preferably, the anion (A) may be at least one selected from the group consisting of F, Cl, Br, I, S and any combination thereof. The substitution of the oxygen ion with the anion (A) results in a high binding ability of the oxide with the transition metal and prevention of structural transition of the cathode active material, thereby improving the battery lifespan. If an amount of the substituent anion (A) is excessively high (z>0.5), the oxide cannot maintain a stable spinel structure, which may undesirably lead to deterioration of lifespan characteristics. More preferably, a substitution amount of the anion, i.e. a value of the symbol z, is in a range of 0.01 to 0.2.

Further, as defined hereinbefore, a portion of Mn in the lithium/manganese spinel oxide may be unsubstituted or substituted with a metal (M) having an oxidation number of 2 to 3. However, substitution of some Mn with the metal (M), e.g. 0<y≦0.2, in the lithium/manganese spinel oxide of Formula I, as will be confirmed through the following examples, leads to a further improvement in the lifespan characteristics of the cathode active material, as compared to non-substitution of Mn with the metal. Preferred examples of the metal (M) may include B, Mg, Al, Ca, Sr, Co, Ni, Cr, Cu, Fe, Ti, Y and Zn. Particularly preferred is Al.

The cathode active material in accordance with the present invention incorporates a given amount of a lithium/nickel/cobalt/manganese composite oxide of Formula II which is an active material expected to increase the lifespan due to a higher stability thereof. The mixing ratio of the aforementioned two composite oxides (Formula I and II) is preferably in the range of 90:10 to 10:90 (w/w). If the content of the composite oxide (I) among two composite oxides is excessively low, the safety of the battery is lowered. On the other hand, if the content of the composite oxide (II) is excessively low, it is undesirably difficult to achieve desired lifespan characteristics. These facts will also be illustrated and confirmed in the following Examples and Comparative Examples hereinafter. A more preferred mixing ratio of the lithium/manganese spinel oxide (Formula I) and the lithium/nickel/cobalt/manganese oxide is in the range of 30:70 to 90:10.

Particularly preferred examples of lithium/nickel/cobalt/manganese oxide of Formula II may include $Li_{1+a}Ni_{1/3}Mn_{1/3}Co_{1/3}O_2$ and $Li_{1+a}Ni_{0.4}Mn_{0.4}Co_{0.2}O_2$.

Methods of preparing lithium metal composite oxides, such as lithium/manganese spinel oxides of Formula I and lithium/nickel/cobalt/manganese composite oxides of Formula II, are well-known in the art and thus the details thereof will not be described herein.

Hereinafter, fabrication of a cathode containing the cathode active material according to the present invention will be specifically illustrated.

First, the cathode active material of the present invention, and a binder and a conductive material in a content of 1 to 20% by weight relative to the active material are added to a dispersion solvent and the resulting dispersion is stirred to prepare an electrode paste. The paste is applied to a metal plate for a current collector which is then pressed and dried to fabricate a laminate electrode.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

As examples of the binder that may be utilized in the present invention, mention may be made of polytetrafluoroethylene (PTFE), polyvinylidene fluoride (PVdF), cellulose, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

There is no particular limit to the conductive material, so long as it has suitable conductivity without causing chemical changes in the fabricated battery. As examples of the conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

Where appropriate, the filler may be optionally added as an ingredient to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

Representative examples of the dispersion solvent that can be used in the present invention may include isopropyl alcohol, N-methyl pyrrolidone (NMP) and acetone.

Uniform application of the paste of electrode materials to a metal material may be carried out by conventional methods known in the art or appropriate novel methods, taking into consideration physico-chemical properties of materials to be used. For example, preferably the electrode paste is distributed onto the current collector and is then uniformly dispersed thereon using a doctor blade or the like. Where appropriate, distribution and dispersion of the electrode paste may also be performed in a single step. Further, application of the electrode paste may be carried out by a method selected from die casting, comma coating, screen printing and the like. Alternatively, application of the electrode paste may be carried out by molding the paste on a separate substrate and then binding it to the current collector via pressing or lamination.

Drying of the paste applied over the metal plate is preferably carried out in a vacuum oven at 50 to 200° C. for 1 to 3 days.

Further, the present invention provides a lithium secondary battery comprising an electrode assembly composed of the above-fabricated cathode and an anode, which are arranged opposite to each other with a separator therebetween, and a lithium salt-containing non-aqueous electrolyte.

The anode is, for example, fabricated by applying an anode active material to an anode current collector, followed by drying. If desired, the anode may further optionally include other components such as a conductive material, a binder and a filler, as described above.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesion to the anode active material. In addition, the anode current collector may take various forms including films, sheets, foils, nets, porous structures, foams and non-woven fabrics.

As examples of the anode active materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, or Ge; Me': Al, B, P, Si, Group I, Group II and Group III elements of the Periodic Table of the Elements, or halogen atoms; $0<x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $P_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, made of an olefin polymer such as polypropylene and/or glass fibers or polyethylene, which have chemical resistance and hydrophobicity, or kraft papers are used. Typical examples of currently commercially available products for the separator may include Celgard series such as Celgadr® 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase the battery stability. Representative examples of the gel polymer may include polyethylene oxide, polyvinylidene fluoride and polyacrylonitrile.

When a solid electrolyte such as a polymer is employed as the electrolyte, the solid electrolyte may also serve as both the separator and electrolyte.

The lithium salt-containing non-aqueous electrolyte is composed of a non-aqueous electrolyte and lithium. As the non-aqueous electrolyte, a non-aqueous electrolytic solution, an organic solid electrolyte or an inorganic solid electrolyte may be utilized.

As examples of the non-aqueous electrolytic solution that can be used in the present invention, mention may be made of aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy Franc, 2-methyl tetrahydrofuran, dimethylsulfoxide, 1,3-dioxolane, 4-methyl-1,3-dioxene, diethylether, formamide, dimethylfommamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlC_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The secondary battery in accordance with the present invention, as will be illustrated and confirmed in the following Examples and Experimental Examples, has a combination of excellent lifespan and safety, and therefore may be particularly preferably used as the battery for both medium-sized and large-sized battery modules. Accordingly, the present invention further provides a medium/large-sized battery module comprising the aforementioned secondary battery as a unit battery. Such a medium/large-sized battery module may be preferably applied as a power source requiring high power and large capacity, which is used for electric vehicles (EVs), hybrid electric vehicles (HEVs), electric motorcycles and electric bikes.

The construction of the medium/large-sized battery module and the fabrication method thereof are well-known in the art and thus the details thereof will be omitted herein.

EXAMPLES

Now, the present invention will be described in more detail with reference to the following Examples. These examples are provided only for illustrating the present invention and should not be construed as limiting the scope and spirit of the present invention.

Example 1

A lithium/manganese spinel oxide of $Li_{1+x}Mn_2O_{3.95}F_{0.05}$ and a lithium/nickel/cobalt/manganese composite oxide of $Li_{1+a}Ni_{1/3}Mn_{1/3}Co_{1/3}O_2$ were mixed in a weight ratio of 1:1 to thereby prepare a cathode active material. The cathode active material was mixed with 5% by weight of carbon black and 5% by weight of PVDF as a binder, and stirred with NMP as a solvent. The resulting mixture was coated on aluminum foil as a metal current collector which was then dried in a vacuum oven at 120° C. for more than 2 hours, thereby fabricating a cathode.

An electrode assembly was fabricated using the thus-fabricated cathode, an anode which was fabricated by coating mesocarbon microbeads (MCMBs) as artificial graphite on copper foil, and a porous separator made of polypropylene. The electrode assembly was placed in a pouch case to which electrode leads were then connected. Thereafter, as an electrolyte, a solution of 1M $LiPF_6$ salt in ethylene carbonate (EC) and dimethyl carbonate (DMC) (1:1, v/v) was injected thereto, followed by sealing the case to thereby fabricate a lithium secondary battery.

The thus-fabricated lithium secondary battery was subjected to charge/discharge cycling in a voltage range of 3.0 to 4.2 V and lifespan characteristics of the battery were measured. The results thus obtained are given in Table 1 below. In the above charge/discharge cycling experiment, charging of the secondary battery was carried out within 2 hours, whereas discharging of the battery was carried out within 1 hour.

Example 2

A lithium secondary battery was fabricated in the same manner as in Example 1, except that a cathode active material was prepared using a substituted lithium/manganese spinel oxide of $Li_{1+x}Mn_2O_{3.8}F_{0.2}$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

Example 3

A lithium secondary battery was fabricated in the same manner as in Example 1, except that a cathode active material was prepared using a substituted lithium/manganese spinel oxide of $Li_{1+x}Mn_2O_{3.5}F_{0.5}$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

Example 4

A lithium secondary battery was fabricated in the same manner as in Example 1, except that a cathode active material was prepared using a substituted lithium/manganese spinel oxide of $Li_{1+x}Mn_2O_{3.95}S_{0.05}$, instead of using $Li_{1+x}Mn_2O_{3.95}F_{0.055}$. The thus-fabricated lithium secondary battery was subjected to charge/discharge cycling in a voltage range of 3.0 to 4.2 V and lifespan characteristics of the battery were measured. The results are given in Table 1 below.

Example 5

A lithium secondary battery was fabricated in the same manner as in Example 1, except that a cathode active material was prepared using a substituted lithium/manganese spinel oxide of $Li_{1+x}Mn_2O_{3.8}SO_2$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

Example 6

A lithium secondary battery was fabricated in the same manner as in Example 1, except that a cathode active material was prepared using a substituted lithium/manganese spinel oxide of $Li_{1+x}Mn_2O_{3.5}S_{0.5}$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

Comparative Example 1

A lithium secondary battery was fabricated in the same manner as in Example 1, except that a cathode active material was prepared using a non-substituted lithium/manganese spinel oxide of $Li_{1+x}Mn_2O_4$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

Comparative Example 2

A lithium secondary battery was fabricated in the same manner as in Example 1, except that a cathode active material was prepared using a substituted lithium/manganese spinel oxide of $Li_{1+x}Mn_2O_{3.3}F_{0.7}$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

Comparative Example 3

A lithium secondary battery was fabricated in the same manner as in Example 1, except that a cathode active material was prepared using a substituted lithium/manganese spinel oxide of $Li_{1+x}Mn_2O_{3.3}S_{0.7}$, instead of using $Li_{1+x}Mn_2O_{3.95}F_{0.05}$. The thus-fabricated lithium secondary battery was subjected to charge/discharge cycling in a voltage range of 3.0 to 4.2 V and lifespan characteristics of the battery were measured. The results are given in Table 1 below.

TABLE 1

| Example No. | Substituent anions | Anion-substituted amount (z) | Lifespan characteristics (Capacity at 300 cycles relative to initial capacity, %) |
|---|---|---|---|
| Ex. 1 | F | 0.05 | 79 |
| Ex. 2 | F | 0.2 | 81 |
| Ex. 3 | F | 0.5 | 81 |
| Ex. 4 | S | 0.05 | 80 |
| Ex. 5 | S | 0.2 | 82 |
| Ex. 6 | S | 0.5 | 82 |
| Comp. Ex. 1 | — | 0 | 63 |
| Comp. Ex. 2 | F | 0.7 | 77 |
| Comp. Ex. 3 | S | 0.7 | 76 |

As can be seen from Table 1, in the composite oxide mixtures of the cathode active materials, the substitution of an oxygen site of the lithium/manganese spinel oxide with fluoro (F) or sulfur (S) has led to significant improvements in lifespan characteristics of the battery. In addition, a higher anion-substituted amount (a higher z-value) has led to further improvements in the lifespan characteristics. However, as can be seen in Comparative Examples 2 and 3, it was confirmed that when the substitution amount, i.e., the z value, exceeds 0.5, the improvement degree in the lifespan characteristics of the battery decreases.

Example 7

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+x}Ni_{1/3}Mn_{1/3}Co_{1/3}O_2$ in a weight ratio of 90:10. The thus-fabricated lithium secondary battery was subjected to charge/discharge cycling in a voltage range of 3.0 to 4.2 V and lifespan characteristics of the battery were measured. The results are given in Table 2 below.

Example 8

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+a}Ni_{1/3}Mn_{1/3}Co_{1/2}O_2$ in a weight ratio of 70:30. The thus-fabricated lithium secondary battery was subjected to charge/discharge cycling in a voltage range of 3.0 to 4.2 V and lifespan characteristics of the battery were measured. The results are given in Table 2 below.

Example 9

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+a}Ni_{1/3}Mn_{1/3}CO_{1/3}O_2$ in a weight ratio of 30:70. The thus-fabricated lithium secondary battery was subjected to charge/discharge cycling in a voltage range of 3.0 to 4.2 V and lifespan characteristics of the battery were measured. The results are given in Table 2 below.

Example 10

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+x}Ni_{1/3}Mn_{1/3}Co_{1/3}O_2$ in a weight ratio of 10:90. The thus-fabricated lithium secondary battery was subjected to charge/discharge cycling in a voltage range of 3.0 to 4.2 V and lifespan characteristics of the battery were measured. The results are given in Table 2 below.

Comparative Example 4

A lithium secondary battery was fabricated in the same manner as in Example 1, except that a cathode active material was prepared using only a substituted lithium/manganese spinel oxide of $Li_{1+x}Mn_2O_{3.95}S_{0.05}$. The thus-fabricated lithium secondary battery was subjected to charge/discharge cycling in a voltage range of 3.0 to 4.2 V and lifespan characteristics of the battery were measured. The results are given in Table 2 below.

Comparative Example 5

A lithium secondary battery was fabricated in the same manner as in Example 1, except that a cathode active material was prepared using only a lithium/nickel/cobalt/manganese composite oxide of $Li_{1+x}Ni_{1/3}Mn_{1/3}Co_{1/3}O_2$. The thus-fabricated lithium secondary battery was subjected to charge/discharge cycling in a voltage range of 3.0 to 4.2 V and lifespan characteristics of the battery were measured. The results are given in Table 2 below.

TABLE 2

| Example No. | Weight ratio of S-substituted lithium/manganese spinel (z = 0.05) | Weight ratio of Li/Ni/Co/Mn composite oxide $Li_{1+a}Ni_{1/3}Mn_{1/3}Co_{1/3}O_2$ | Lifespan characteristics (Capacity at 300 cycles relative to initial capacity, %) |
|---|---|---|---|
| Ex. 7 | 90 | 10 | 78 |
| Ex. 8 | 70 | 30 | 81 |
| Ex. 4 | 50 | 50 | 80 |
| Ex. 9 | 30 | 70 | 78 |
| Ex. 10 | 10 | 90 | 76 |
| Comp. Ex. 4 | 100 | 0 | 64 |
| Comp. Ex. 5 | 0 | 100 | 72 |

As can be seen from Table 2, lifespan characteristics of the battery began to improve when more than 10% lithium/nickel/cobalt/manganese composite oxide was added to the S-substituted lithium/manganese spinel oxide, and it could be confirmed that the thus-obtained lifespan characteristics are similar to lifespan characteristics achieved upon addition of more than 30% lithium/nickel/cobalt/manganese composite oxide. However, an excessively high content of the lithium/nickel/cobalt/manganese composite oxide may result in relatively low safety of the battery and therefore it is preferred to use the lithium/nickel/cobalt/manganese composite oxide in an amount of less than 90%.

Example 11

A lithium secondary battery was fabricated in the same manner as in Example 1, except that a cathode active material was prepared using a substituted lithium/manganese spinel oxide of $Li_{1+x}Mn_2O_{3.95}SO_{0.05}$ and a lithium/nickel/cobalt/manganese composite oxide of $Li_{1+x}Ni_{0.4}Mn_{0.4}Co_{0.2}O_2$ in a weight ratio of 90:10. The thus-fabricated lithium secondary battery was subjected to charge/discharge cycling in a voltage range of 3.0 to 4.2 V and lifespan characteristics of the battery were measured. The results are given in Table 3 below.

Example 12

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+x}Ni_{0.4}Mn_{0.4}Co_{0.2}O_2$ in a weight ratio of 70:30. The thus-fabricated lithium secondary battery was subjected to charge/discharge cycling in a voltage range of 3.0 to 4.2 V and lifespan characteristics of the battery were measured. The results are given in Table 3 below.

Example 13

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+x}Ni_{0.4}Mn_{0.4}Co_{0.2}O_2$ in a weight ratio of 50:50. The thus-fabricated lithium secondary battery was subjected to charge/discharge cycling in a voltage range of 3.0 to 4.2 V and lifespan characteristics of the battery were measured. The results are given in Table 3 below.

Example 14

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+a}Ni_{0.4}Mn_{0.4}Co_{0.2}O_2$ in a weight ratio of 30:70. The thus-fabricated lithium secondary battery was subjected to charge/discharge cycling in a voltage range of 3.0 to 4.2 V and lifespan characteristics of the battery were measured. The results are given in Table 3 below.

Example 15

A lithium secondary battery was fabricated in the same manner as in Example 1, except that a cathode active material was prepared using a substituted lithium/manganese spinel oxide of $Li_{1+x}Mn_2O_{3.95}S_{0.05}$ and a lithium/nickel/cobalt/manganese composite oxide of $Li_{1+a}Ni_{0.4}Mn_{0.4}Co_{0.2}O_2$ in a weight ratio of 10:90. The thus-fabricated lithium secondary battery was subjected to charge/discharge cycling in a voltage range of 3.0 to 4.2 V and lifespan characteristics of the battery were measured. The results are given in Table 3 below.

Comparative Example 6

A lithium secondary battery was fabricated in the same manner as in Example 1, except that a cathode active material was prepared using only a lithium/nickel/cobalt/manganese composite oxide of $Li_{1+x}Ni_{0.4}Mn_{0.4}Co_{0.4}Co_{0.2}O_2$. The thus-fabricated lithium secondary battery was subjected to charge/discharge cycling in a voltage range of 3.0 to 4.2 V and lifespan characteristics of the battery were measured. The results are given in Table 3 below.

TABLE 3

| Example No. | Weight ratio of S-substituted lithium/manganese spinel (z = 0.05) | Weight ratio of Li/Ni/Co/Mn composite oxide $Li_{1+a}Ni_{0.4}Mn_{0.4}Co_{0.2}O_2$ | Lifespan characteristics (Capacity at 300 cycles relative to initial capacity, %) |
|---|---|---|---|
| Ex. 11 | 90 | 10 | 79 |
| Ex. 12 | 70 | 30 | 82 |
| Ex. 13 | 50 | 50 | 81 |
| Ex. 14 | 30 | 70 | 79 |
| Ex. 15 | 10 | 90 | 78 |
| Comp. Ex. 4 | 100 | 0 | 64 |
| Comp. Ex. 6 | 0 | 100 | 73 |

As can be seen from Table 3, even upon addition of a different lithium/nickel/cobalt/manganese composite oxide ($Li_{1+a}Ni_{0.4}Mn_{0.4}Co_{0.2}O_2$), the lifespan characteristics of the battery began to improve when such a composite oxide was added in an amount of more than 10% to the S-substituted lithium/manganese spinel, and it could be confirmed that the thus-obtained lifespan characteristics are similar to lifespan characteristics achieved upon addition of more than 30% lithium/nickel/cobalt/manganese composite oxide. However, an excessively high content of the lithium/nickel/cobalt/manganese composite oxide may result in relatively low safety of the battery and therefore it is preferred to use the lithium/nickel/cobalt/manganese composite oxide in an amount of less than 90%.

Example 16

A lithium secondary battery was fabricated in the same manner as in Example 1, except that a cathode active material was prepared using a substituted lithium/manganese spinel oxide of $Li_{1+x}Mn_{1.9}Al_{0.1}O_{3.95}S_{0.05}$ and a lithium/nickel/cobalt/manganese composite oxide of $Li_{1+a}Ni_{1/3}Mn_{1/3}CO_{1/3}O_2$ in a weight ratio of 90:10. The thus-fabricated lithium secondary battery was subjected to charge/discharge cycling in a voltage range of 3.0 to 4.2 V and lifespan characteristics of the battery were measured. The results are given in Table 4 below.

Example 17

A lithium secondary battery was fabricated in the same manner as in Example 1, except that a cathode active material was prepared using a substituted lithium/manganese spinel oxide of $Li_{1+x}Mn_{1.9}Al_{0.1}O_{3.95}S_{0.05}$ and a lithium/nickel/cobalt/manganese composite oxide of $Li_{+a}Ni_{1/3}Mn_{1/3}Co_{1/3}O_2$ in a weight ratio of 70:30. The thus-fabricated lithium secondary battery was subjected to charge/discharge cycling in a voltage range of 3.0 to 4.2 V and lifespan characteristics of the battery were measured. The results are given in Table 4 below.

Example 18

A lithium secondary battery was fabricated in the same manner as in Example 1, except that a cathode active material was prepared using a substituted lithium/manganese spinel oxide of $Li_{1+x}Mn_{0.9}Al_{0.1}O_{3.95}S_{0.05}$ and a lithium/nickel/cobalt/manganese composite oxide of $Li_{1+a}Ni_{1/3}Mn_{1/3}CO_{1/3}O_2$ in a weight ratio of 50:50. The thus-fabricated lithium secondary battery was subjected to charge/discharge cycling in a voltage range of 3.0 to 4.2 V and lifespan characteristics of the battery were measured. The results are given in Table 4 below.

Example 19

A lithium secondary battery was fabricated in the same manner as in Example 1, except that a cathode active material was prepared using a substituted lithium/manganese spinel oxide of $Li_{+x}Mn_{1.9}Al_{0.1}O_{3.95}S_{0.05}$ and a lithium/nickel/cobalt/manganese composite oxide of $Li_{+a}Ni_{1/3}Mn_{1/3}Co_{1/3}O_2$ in a weight ratio of 30:70. The thus-fabricated lithium secondary battery was subjected to charge/discharge cycling in a voltage range of 3.0 to 4.2 V and lifespan characteristics of the battery were measured. The results are given in Table 4 below.

Example 20

A lithium secondary battery was fabricated in the same manner as in Example 1, except that a cathode active material was prepared using a substituted lithium/manganese spinel oxide of $Li_{1+x}Mn_{1.9}Al_{0.1}O_{3.95}S_{0.05}$ and a lithium/nickel/cobalt/manganese composite oxide of $Li_{1+a}Ni_{1/3}Mn_{1/3}CO_{1/3}O_2$ in a weight ratio of 10:90. The thus-fabricated lithium secondary battery was subjected to charge/discharge cycling in a voltage range of 3.0 to 4.2 V and lifespan characteristics of the battery were measured. The results are given in Table 4 below.

Comparative Example 7

A lithium secondary battery was fabricated in the same manner as in Example 1, except that a cathode active material was prepared using only a substituted lithium/manganese spinel oxide of $Li_{1+x}Mn_{1.9}Al_{0.1}O_{3.95}S_{0.05}$. The thus-fabricated lithium secondary battery was subjected to charge/discharge cycling in a voltage range of 3.0 to 4.2 V and lifespan characteristics of the battery were measured. The results are given in Table 4 below.

TABLE 4

| Example No. | Weight ratio of Al, S- substituted lithium/manganese spinel (y = 0.1 and z = 0.05) | Weight ratio of Li/Ni/Co/Mn composite oxide $Li_{1+a}Ni_{1/3}Mn_{1/3}Co_{1/3}O_2$ | Lifespan characteristics (Capacity at 300 cycles relative to initial capacity, %) |
|---|---|---|---|
| Ex. 16 | 90 | 10 | 80 |
| Ex. 17 | 70 | 30 | 83 |
| Ex. 18 | 50 | 50 | 85 |
| Ex. 19 | 30 | 70 | 83 |
| Ex. 20 | 10 | 90 | 82 |
| Comp. Ex. 7 | 100 | 0 | 66 |
| Comp. Ex. 5 | 0 | 100 | 72 |

As shown in Table 4, it can be seen that the substitution of some Mn with Al in the lithium/manganese spinel leads to a further improvement in the lifespan characteristics of the battery and a preferred content of the thus-substituted oxide is less than 90%.

Further, as compared to the cathode active materials of Examples 7 to 10 using $Li_{1+x}Mn_2O_{3.95}S_{0.05}$ as the lithium/manganese spinel and $Li_{1+a}Ni_{1/3}Mn_{1/3}Co_{1/3}O_2$ as the lithium/nickel/cobalt/manganese composite oxide (see Table 2), the cathode active materials of Examples 16 to 20 using $Li_{1+x}Mn_{1.9}Al_{0.1}O_{3.95}S_{0.05}$ as the lithium/manganese spinel and $Li_{1+a}Ni_{1/3}Mn_{1/3}Co_{1/3}O_2$ as the lithium/nickel/cobalt/manganese composite oxide (see Table 4) exhibit superior lifespan characteristics. In addition, it can be seen that improvements in the lifespan characteristics increase with a higher content (more than 50% by weight) of the lithium/nickel/cobalt/manganese composite oxide. Therefore, when the same lithium/nickel/cobalt/manganese composite oxide is used in admixture with the spinel oxide, the substitution of some Mn with Al in the lithium/manganese spinel leads to an increase in the lifespan characteristics of the battery.

INDUSTRIAL APPLICABILITY

As apparent from the above description, a lithium secondary battery using a mixture of a manganese spinel oxide having a substitution of an oxygen site with a certain anion and a certain lithium/nickel/cobalt/manganese composite oxide, according to the present invention, as a cathode active material, can secure safety of the battery and improve a lifespan thereof, even under high current, short period charge/discharge cycle conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material for a lithium secondary battery, comprising a mixture of a lithium/manganese spinel oxide represented by Formula I below and a lithium/nickel/cobalt/manganese oxide represented by Formula II below:

  (I)

  (II)

wherein,

M is a metal having an oxidation number of 2 to 3;
A is an anion having an oxidation number of −1 or −2;
$0 \leq x \leq 0.2$;
$0 \leq y \leq 0.2$;
$0 < z \leq 0.5$;
$0 \leq a \leq 0.1$;
$0.2 \leq b \leq 0.7$;
$0.2 \leq c \leq 0.7$; and
$b+c<1$.

2. The cathode active material according to claim 1, wherein a value of the symbol y in Formula I is $0<y \leq 0.2$.

3. The cathode active material according to claim 1, wherein the symbol M is one or more selected from the group consisting of B, Mg, Al, Ca, Sr, Co, Ni, Cr, Cu, Fe, Ti, X, Zn and any combination thereof.

4. The cathode active material according to claim 3, wherein the symbol M is Al.

5. The cathode active material according to claim 1, wherein the symbol A is one or more selected from the group consisting of F, Cl, Br, S and any combination thereof.

6. The cathode active material according to claim 1, wherein a value of the symbol z is in the range of 0.01 to 0.2.

7. The cathode active material according to claim 1, wherein the lithium/nickel/cobalt/manganese oxide of Formula II is $Li_{1+a}Ni_{1/3}Mn_{1/3}Co_{1/3}O_2$.

8. The cathode active material according to claim 1, wherein the lithium/nickel/cobalt/manganese oxide of Formula II is $Li_{1+a}Ni_{0.4}Mn_{0.4}Co_{0.2}O_2$.

9. The cathode active material according to claim 1, wherein the mixing ratio of lithium/manganese spinel oxide: lithium/nickel/cobalt/manganese oxide is in the range of 10:90 to 90:10 (w/w).

10. The cathode active material according to claim 1, wherein the mixing ratio of lithium/manganese spinel oxide: lithium/nickel/cobalt/manganese oxide is in the range of 30:70 to 90:10 (w/w).

11. A lithium secondary battery comprising the cathode active material of claim 1.

12. A high-power, large-capacity medium/large-sized battery module comprising the lithium secondary battery of claim 11 as a unit battery.

* * * * *

UNITED STATES PATENT AND TRADEMARK OFFICE
CERTIFICATE OF CORRECTION

| | |
|---|---|
| PATENT NO. | : 7,816,033 B2 |
| APPLICATION NO. | : 12/227837 |
| DATED | : October 19, 2010 |
| INVENTOR(S) | : Ji Heon Ryu et al. |

Page 1 of 1

It is certified that error appears in the above-identified patent and that said Letters Patent is hereby corrected as shown below:

Column 16, line 3, please replace the phrase "Ti, X, Zn" with --Ti, Y, Zn--.

Signed and Sealed this
Twenty-fourth Day of July, 2012

David J. Kappos
*Director of the United States Patent and Trademark Office*